(12) United States Patent
Jayachandra

(10) Patent No.: US 7,420,543 B2
(45) Date of Patent: Sep. 2, 2008

(54) USER-FRIENDLY BRAHMI-DERIVED HINDI KEYBOARD

(76) Inventor: Mahesh Jayachandra, 75 7th Cross, Kumara Park West, Bangalore, Karnataka 560 020 (IN)

( * ) Notice: Subject to any disclaimer, the term of this patent is extended or adjusted under 35 U.S.C. 154(b) by 617 days.

(21) Appl. No.: 10/875,344

(22) Filed: Jun. 23, 2004

(65) Prior Publication Data
US 2005/0017955 A1 Jan. 27, 2005

Related U.S. Application Data

(63) Continuation-in-part of application No. 10/038,529, filed on Jan. 3, 2002.

(51) Int. Cl.
G09G 5/00 (2006.01)
(52) U.S. Cl. .......... 345/171; 345/156; 345/168
(58) Field of Classification Search ......... 345/171, 345/156, 168
See application file for complete search history.

(56) References Cited

U.S. PATENT DOCUMENTS

| | | | |
|---|---|---|---|
| 3,945,482 A | 3/1976 | Einbinder | |
| 4,580,916 A * | 4/1986 | Rolfo et al. | 400/109 |
| 4,680,710 A | 7/1987 | Kizilbash | |
| 5,457,454 A | 10/1995 | Sugano | |
| 5,778,356 A | 7/1998 | Heiny | |
| 5,812,122 A | 9/1998 | Ng | |
| 5,836,705 A | 11/1998 | Choate | |
| 5,880,685 A * | 3/1999 | Weeks | 341/22 |
| 5,945,928 A | 8/1999 | Kushler et al. | |
| 5,999,950 A | 12/1999 | Krueger et al. | |
| 6,005,549 A | 12/1999 | Forest | |
| 6,053,647 A | 4/2000 | Parkinson | |
| 6,198,474 B1 * | 3/2001 | Roylance | 345/168 |
| 6,231,252 B1 | 5/2001 | Kitamura | |
| 6,275,216 B1 | 8/2001 | Kitamura | |
| 6,281,884 B1 | 8/2001 | Chang et al. | |
| 6,631,501 B1 | 10/2003 | Jurion et al. | |
| 2003/0119551 A1 * | 6/2003 | Laukkanen et al. | 455/556 |

OTHER PUBLICATIONS

Apple Computer, Inc., http://manuals.info.apple.com/Apple_Support_Area/Manuals/software/u9650201zailkdqrc.pdf, 5 pages, (1997).
Bhatt, S., "Character Encoding Standard for Indian Scripts—A Report," http://www.cicc.or.jp/english/hyoujyunka/mlit4/7-3India/India.htm, 6 pages (Apr. 3, 2002).

(Continued)

*Primary Examiner*—Richard Hjerpe
*Assistant Examiner*—Leonid Shapiro
(74) *Attorney, Agent, or Firm*—Merchant & Gould P.C.

(57) ABSTRACT

A character input system using a keyboard having a plurality of keys, at least some of the keys each being assigned at least one Brahmi-derived (e.g., Hindi) script character. At least one key may be assigned a halant. The key assignments may be spatially grouped on the keyboard according to vowels, consonants and the phonetic characteristics of the characters. Hindi script communications may be inputted quickly and efficiently as a result of the arrangement of Hindi character keys and a simplified Hindi character set provided through use of the halant character.

20 Claims, 8 Drawing Sheets

The SHIFTED keyboard: Matras (vowel signs), common conjuncts and miscellaneous keys

OTHER PUBLICATIONS

Bureau of Indian Standards, "Indian Script Code for Information Interchange—ISCII," *IS13194*, pp. 1-34 (1991).

Clews, J., "Multilinguality in Southern Asia: John Clews reports from EMMIT '98 held recently in India on language technology prospects in the region," 3 pages (1999).

Kumar, H., "Key Board Layout," harshkumar@poboxes.com, 4 pages (May 1997).

"Devanagari alphabet," http://www.omniglot.com/writing/devanagari.htm, 4 pages (Apr. 3, 2002).

"Existing standards for codes in respect of Indian scripts.," http://acharya.iitm.ac.in/multi_sys/exist_codes.html, 5 pages (Apr. 3, 2002).

"Hindi—The RashtraBhasha," http://www.indianlanguages.com/hindi/, 1 page (Oct. 10, 2001).

"12.7 Keyboard Encoding," http://tronche.com/gui/x/xlib/input/keyboard-encoding.html, 2 pages (Apr. 3, 2002).

"The Inscript Keyboard," 1 page, date unknown.

* cited by examiner

Figure 1: The Jambu Hindi keyboard:

Row1: All the vowels
Rows 2, 3, 4: Consonants

Figure 2: The SHIFTED keyboard: Matras (vowel signs), common conjuncts and miscellaneous keys

Preferred Embodiment    FIGURE 5

Alternate Embodiment 1

Alternate Embodiment 2

FIGURE 6 The Hindi Script (Vowels & Consonants)

| | | | | | | |
|---|---|---|---|---|---|---|
| Vowels | अ a | आ ā | इ i | ई ī | उ u | ऊ ū |
| Vowels | ऋ r | | | | | |
| Vowels | ए e | ऐ ai | ओ o | औ au | अं aṃ | अः aḥ |
| Consonants (Varg) V1 | क ka | ख kha | ग ga | घ gha | ङ ṅa | |
| V2 | च ca | छ cha | ज ja | झ jha | ञ ña | |
| V3 | ट ṭa | ठ ṭha | ड ḍa | ढ ḍha | ण ṇa | |
| V4 | त ta | थ tha | द da | ध dha | न na | |
| V5 | प pa | फ pha | ब ba | भ bha | म ma | |
| Non Varg (NV) | य ya | र ra | ल la | व va | | |
| NV | श śa | ष ṣa | स sa | ह ha | | |

Fig 8

USER-FRIENDLY BRAHMI-DERIVED HINDI KEYBOARD

CROSS REFERENCE TO RELATED APPLICATIONS

This application is a continuation-in-part and claims priority to U.S. patent application Ser. No. 10/038,529 filed Jan. 3, 2002.

BACKGROUND OF THE INVENTION

Figure 7:
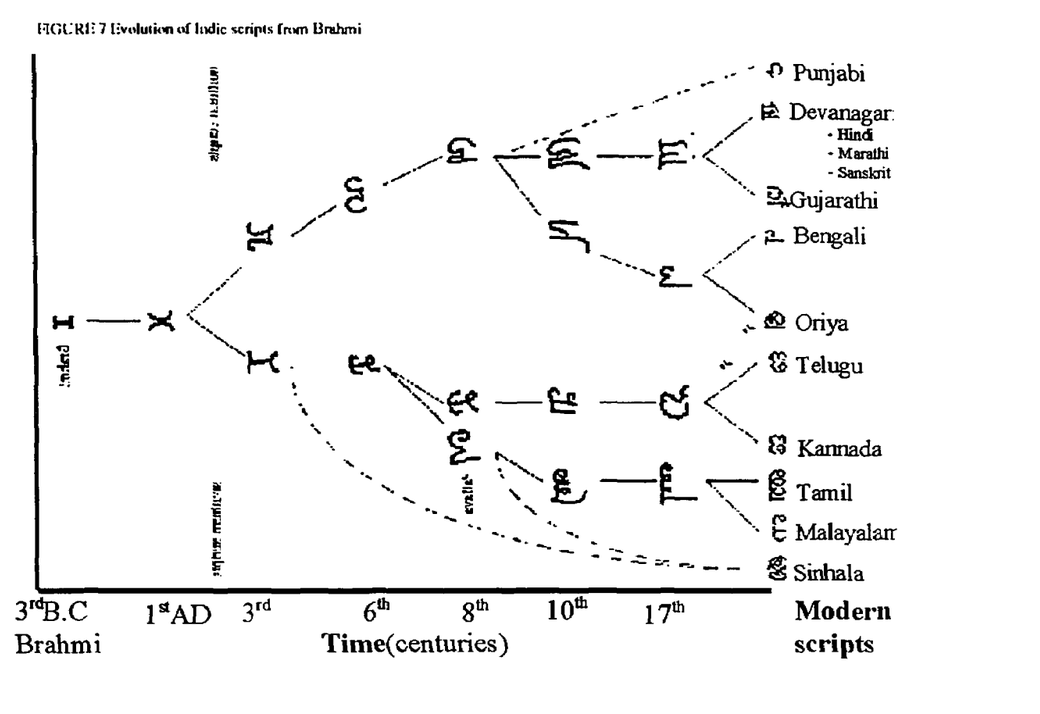
FIG. 7 shows the various Indian language scripts derived from Brahmi.

The Hindi script is a subset of the Devanagari script which in turn evolved from the ancient Brahmi script (FIG. 7). Other Indian languages using the Devanagari script include Marathi and Sanskrit. Other scripts derived from Brahmi include: Gujarathi, Oriya, Punjabi (also called Gurmukhi); Bengali, Assamese, Telugu, Tamil, Kannada, Malayalam, Manipuri (India); Sinhala (Sri Lanka); Nepali (Nepal-derived from Devanagari); Burmese (Myanmar-Burma); Tibetan (Tibet); Laotian (Laos); Thai (Thailand); Khmer (Cambodia); Java, Bali, Batak, Bugis/Buginese (Indonesia); and Tagalog (Philippines)

Hindi is the official language of India. Most Indian school children are required to study Hindi from an early age. In India there are approximately 500 million native Hindi speakers, while more than 300 million use it as their second language. There are approximately 10 million Hindi speakers outside India, primarily in Nepal.

The Devanagari script includes many more characters than western scripts such as the Roman script for the English language. While Hindi has only 12 vowels and 33 consonants, a language written in Devanagari script, such as Hindi, may include in excess of 550 characters because various phonetic characters are combined into conjunct characters. The large number of characters can make keyboard-entry of Devanagari script burdensome and complicated. Furthermore, this problem is exacerbated by the fact that many languages besides Hindi use the Devanagari script (e.g., Marathi and Sanskrit) and Devanagari-based keyboards may cater to all of them, thereby generating additional complexities.

Existing Hindi keyboard solutions typically focus on making available all or most of the 500+characters of the Devanagari script. These comprehensive keyboards may involve complexities such as multiple virtual keyboards and multiple key-stroke characters. These complexities tend to make existing keyboard solutions difficult to learn and use. For these reasons, keyboards based, for example, on the Inscript layout tend to be difficult to use. Additionally, none of the existing keyboards have the whole script, or even most of it, visible on the keyboard.

A variety of solutions have been proposed with regard to keyboards for use with other languages such as English, Korean, Chinese, and Japanese. For example, U.S. Pat. No. 5,836,705 describes a keyboard arrangement to maximize typing speed and data entry and to ease transition from a QWERTY keyboard. This keyboard uses a layout wherein the home keys are assigned according to the frequency of use of the letters.

U.S. Pat. No. 5,945,928 describes a keyboard for the Korean Language. Keys on a keyboard are assigned a plurality of jamos (characters). Additional word processor software analyzes key sequences to resolve ambiguities and determine which characters are intended.

U.S. Pat. No. 5,999,950 describes an on-screen keyboard for the Japanese language. An array of Japanese based Kana characters are displayed. The first selection of a character key causes the display of the character in base kana form. The second consecutive selection of the same key causes the display of the character in a variant form. Subsequent consecutive selections cause the display of the character in further variant forms.

U.S. Pat. No. 6,053,647 describes a "user-friendly and efficient keyboard" for the English language. The keyboard layout places punctuation marks in the center of the keyboard with letters arranged alphabetically on either side of the punctuation marks.

U.S. Pat. No. 6,231,252 describes a downsized keyboard for use with the Japanese language. One vowel is assigned to each key of a first key group. Two consonants are assigned to each key in a second key group. An unvoiced consonant is input with a single key-pressing operation while a voiced consonant is input with a double key-pressing operation.

U.S. Pat. No. 6,275,216 describes a keyboard for entering characters for the Japanese language. One embodiment of the keyboard executes inputting of a character by zero, one, or a plurality of strokes of a code key and sequential stroke of a separator key for selecting a letter.

U.S. Pat. No. 6,281,884 describes a user-definable keyboard apparatus for use with the Chinese language. A key may correspond to one or more Chinese characters and a character may be assigned to one or more keys. The apparatus may automatically verify that a user-defined keyboard is rational by reference to a character sound grouping rules table.

SUMMARY OF THE INVENTION

A user-friendly and efficient keyboard vector which allows a character input system uses a real or virtual keyboard having a plurality of keys, at least some of which are assigned to at least one Brahmi-based script character, such as a Devanagari character, and at least one key being assigned a halant. For simplicity, aspects of the system are described with reference to the Hindi language. However, the keyboard system and method may also be adapted for use with other language scripts that are derived from the Brahmi script.

The vowels of the Hindi script may be grouped together on the keyboard and may be assigned to keys that correspond to the number-row on a standard keyboard. The "vowel signs" or Matras may be accessed by pressing the assigned vowel key with a modifier key (e.g., SHIFT).

In Hindi, the consonants are divided into five Varg subsets and one Non-Varg group. The keyboard may map the five Varg consonant subsets that each contain the five phonetically-related consonants. The Varg consonants may be spatially grouped in sets of five in the way they are learned. Keys of each Varg set may be grouped on keys that are adjacent or diagonal to one another on the keyboard. The keys of each Varg may be grouped in a single row on the keyboard. The final Non-Varg consonants may be mapped to keys that are grouped together on the keyboard. In one embodiment, eight non-Varg consonants are mapped to a group of eight keys.

In another embodiment, vowel keys are mapped to the Hindi vowels, at least some of the vowel keys being arranged in a row. Initial consonants keys are arranged in a plurality of subsets that include keys that are mapped to a group of phonetically-related Varg consonants. At least some of each subset of initial consonant keys may be arranged on a single row, which may be configured horizontally or in another configuration. Final consonant keys (non-Varg) may also be mapped to Hindi final consonants. At least some of the final consonant keys may be arranged in a row.

A halant key may be assigned to the halant character to provide a simplified character set, thereby reducing the number of keys and, therefore, the learning curve for the keyboard user.

In another embodiment, a computer system for use with a language using Hindi script includes a processor, a memory system, a graphical user interface, and a Hindi script keyboard. The keyboard may include a plurality of keys, at least some of which are assigned at least one Hindi script character, and at least one key being assigned a halant. The key assignments may be spatially grouped on the keyboard according to phonetic characteristics of the characters.

In another embodiment, a keyboard adapted for use with Hindi script language may include a group of vowel keys each being assigned a Hindi script vowel, the vowel keys comprising keys corresponding to the number-row on a standard keyboard. The Matras may be accessed by pressing the appropriate vowel key with a modifier key (e.g., SHIFT).

The keyboard may also include a first group of phonetically-related consonant keys comprising keys corresponding to Q-W-E-R-T on a standard keyboard. The keyboard may further include a second group of phonetically-related consonant keys comprising keys corresponding to A-S-D-F-G on a standard keyboard. The keyboard may further include a third group of phonetically-related consonant keys comprising keys corresponding to Z-X-C-V-B on a standard keyboard. The keyboard may further include a fourth group of phonetically-related consonant keys comprising keys corresponding to Y-U-I-O-P on a standard keyboard. The keyboard may further include a fifth group of phonetically-related consonant keys comprising keys corresponding to H-J-K-L-; on a standard keyboard.

DETAILED DESCRIPTION OF THE PREFERRED EMBODIMENTS

Figure 1:
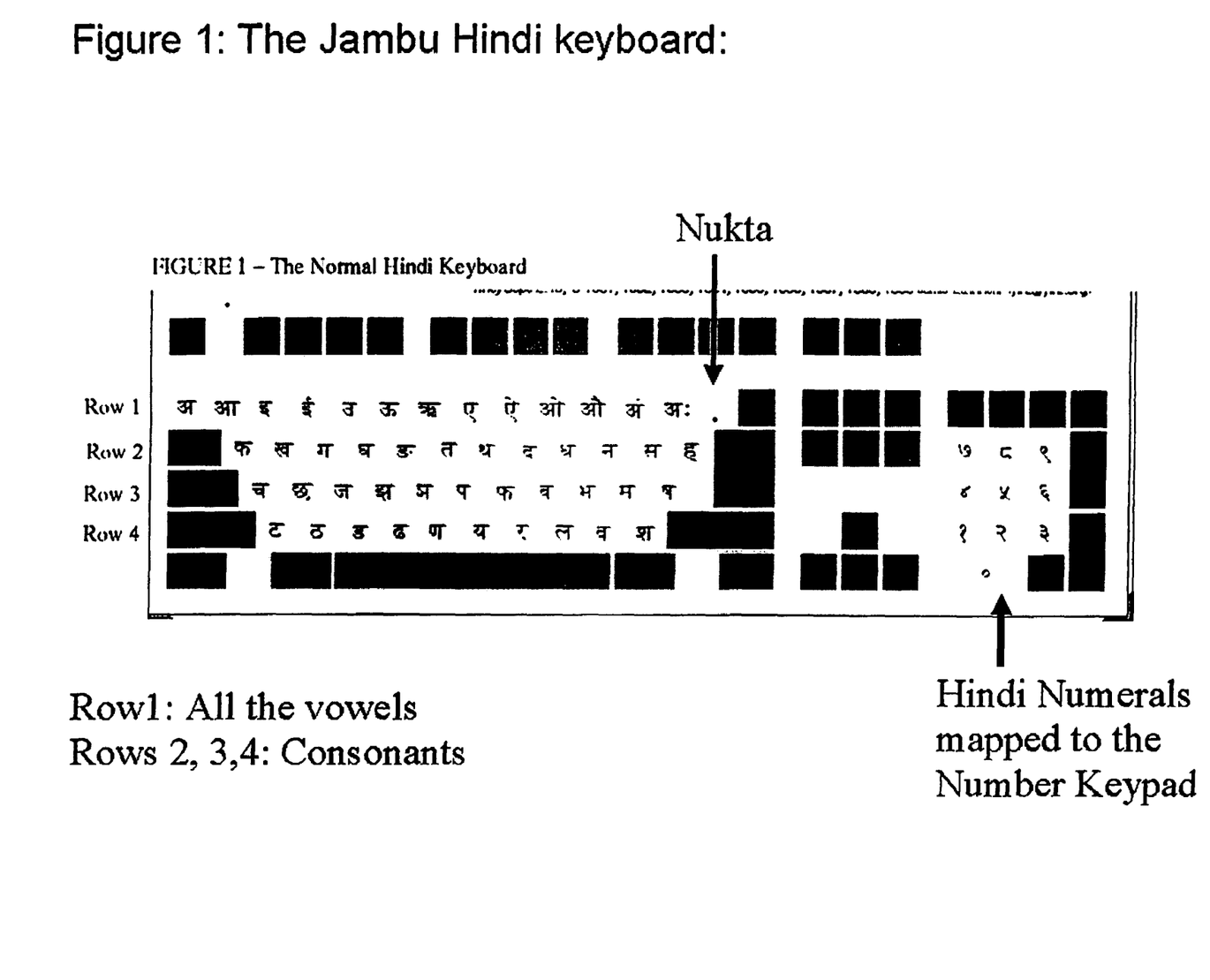
FIG. 1 is a plan view of a keyboard showing Hindi characters mapped to one character set ($G_1$), i.e., upper ASCII set.
Figure 2:
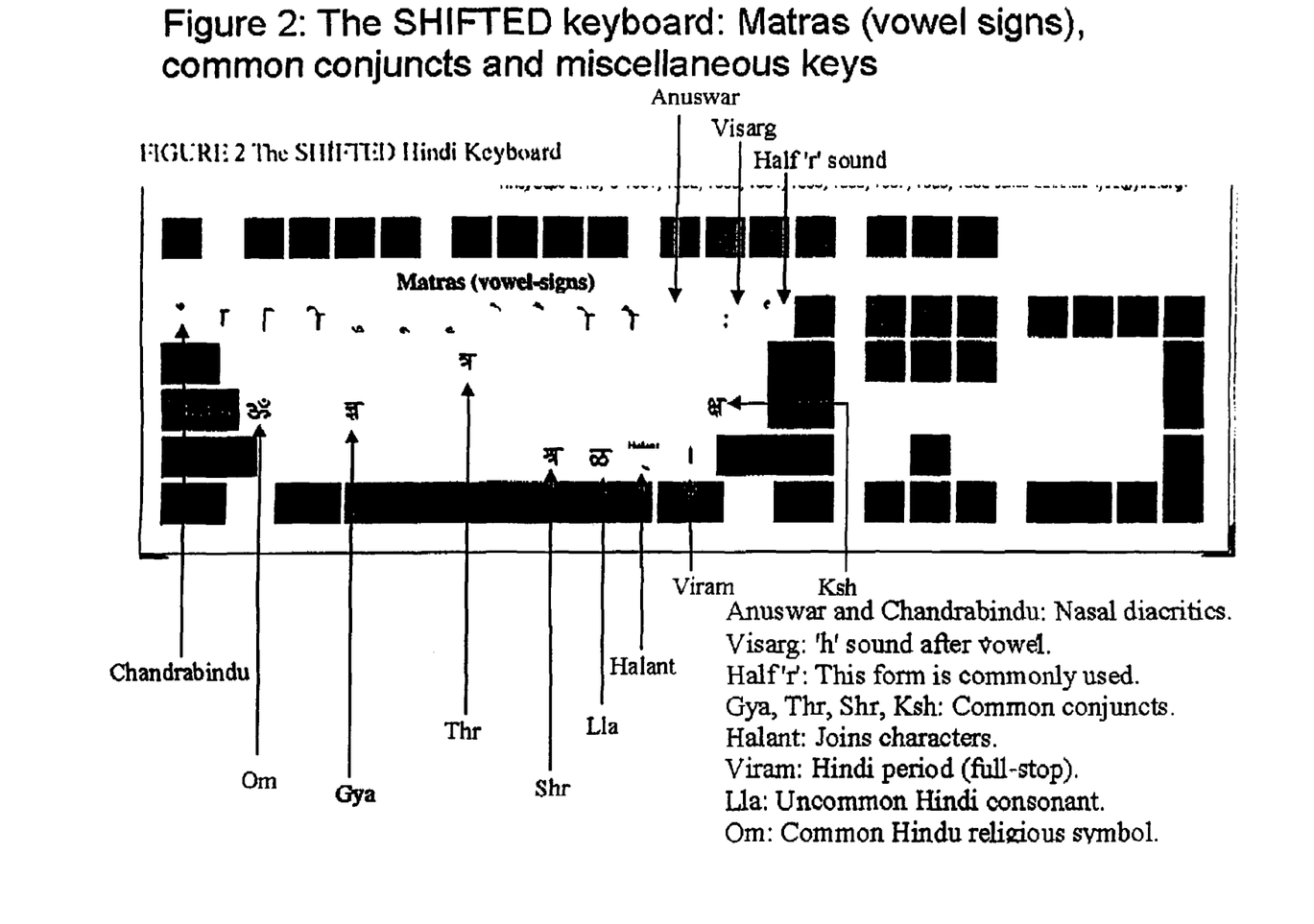
FIG. 2 is a plan view of a keyboard showing additional Hindi characters mapped to the $G_1$ character set which may be accessed using an additional key (e.g., the SHIFT key).

As shown in FIGS. 1 and 2, the layout for a keyboard 20 includes a subset of characters from the Brahmi-based Devanagari script, specific to Hindi. For convenience, reference will be made to the Hindi script and alphabet, although the description and keyboard may also be applied to related Brahmi-derived scripts that have similar characteristics.

Other Brahmi-derived Indian scripts include the Northern scripts Marathi, Sanskrit, Gujarati, Punjabi, Assamese, Bengali, Oriya, Manipuri and Southern scripts Telugu, Tamil, Malayalam, and Kannada. Brahmi derived scripts used in languages outside India include Sinhala, Nepali, Burmese, Tibetan, Laotian, Thai, Khmer, Javanese, Bali, Batak, Bugis/Buginese and Tagalog.

As shown in FIG. 1, a portion of the Hindi alphabet may be mapped to the upper ASCII ($G_1$) character set and the appropriate keyboard files modified, so that the Hindi script may be directly accessed from the keyboard. A key, which may be "sticky," may be used to access English. To simplify use of the keyboard, a "halant" may be used below leading consonants to type both consonants rather than create all the double letters which exist. This use of a halant is an accepted way to write Hindi, and it immediately cuts the number of Hindi character key locations from in excess of 550 to less than 55. This order of magnitude reduction considerably shortens any learning curve.

An additional software program may be used to run through the inputted material and replace all the halant derived compound characters (e.g., consonantal conjuncts) with traditional conjuncts from a library. This may be used in real time or at the end of the input sequence.

A standard personal computer keyboard can typically have two sets of characters ($G_0$ and $G_1$) which are accessible by using the SHIFT and/or the CAPS_LOCK keys. A keyboard configured for English does not require use of the second character set (extended ASSCII or the $G_1$ set) because the English alphabet (26 characters) fits on the first character set (the $G_0$ set). The $G_1$ set is, however, used by other languages. For example, French, German and the Scandinavian languages use the $G_1$ set for their Umlauts, Diacritic signs, and accents. The $G_1$ set is also used with Russian for its Cyrillic alphabet.

The keyboard layout shown in FIGS. 1 and 2 includes the Hindi $G_1$ character set. FIG. 2 shows vowel signs (Matras) and additional commonly used conjuncts accessed by the SHIFT key. In one embodiment, half-forms of consonants may also be accessed by pressing the SHIFT key in conjunction with the corresponding full consonant key. The standard QWERTY keyboard (i.e., the $G_0$ set) may be accessed by another modifier key, e.g., the CAPS_LOCK key. Any other keyboard configurations such as DVORAK, a Spanish language keyboard, etc. may be accessed through a modifier key.

A. Hindi Vowels

Figure 5:
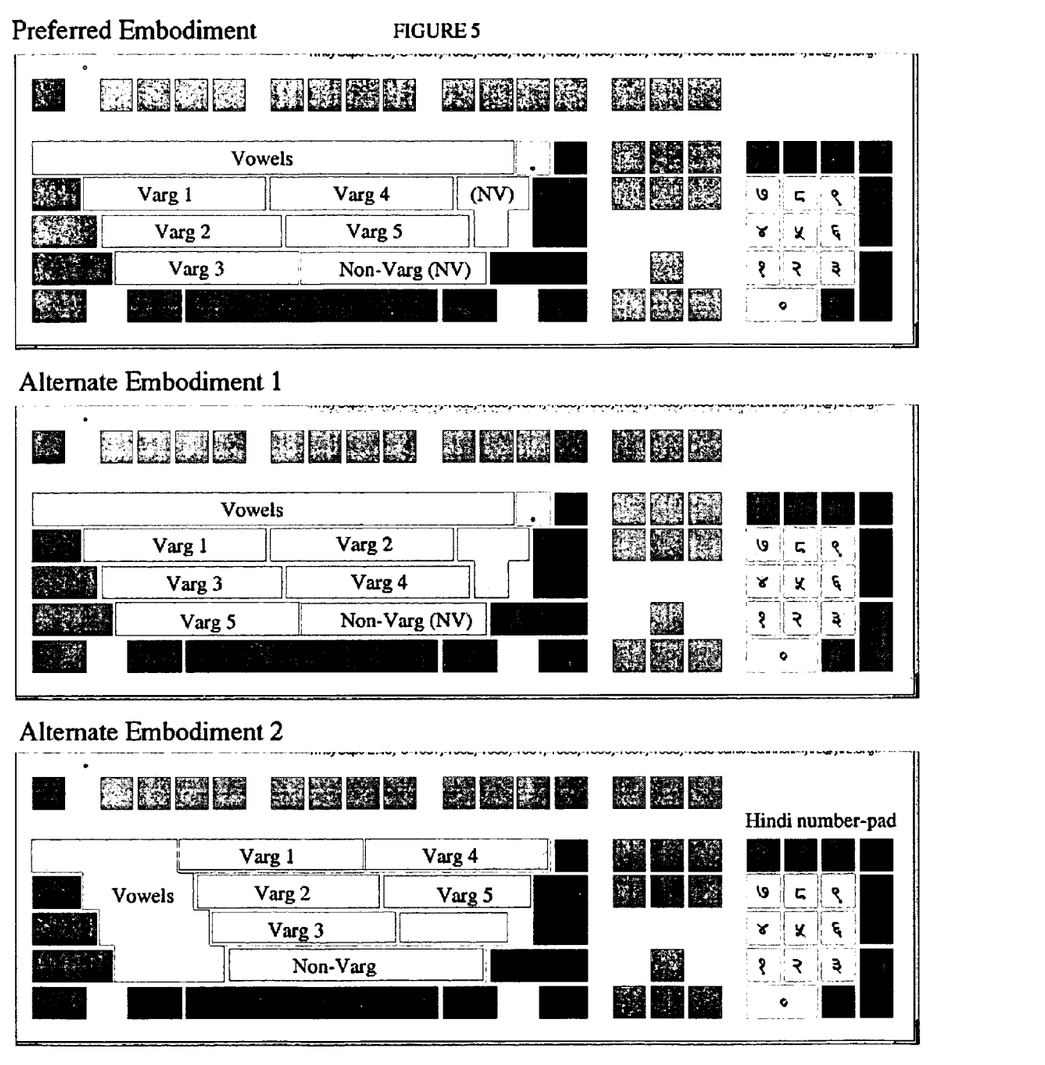
FIG. 5 is a schematic plan view of embodiments of a Hindi keyboard showing Hindi characters mapped to a first character set. The five Varg consonants subsets (V1 to V5) and the Non-Varg consonants (NV) are indicated.

The keyboard may include keys mapped to Hindi vowels, as shown in FIGS. 1 and 5. The various Brahmi-based Indian script languages generally use up to 18 vowels. Hindi uses 13 vowels.

In FIG. 1, the 13 vowel characters of Hindi are provided on the top row of the standard keyboard layout (Row 1). On the standard keyboard, this row typically includes the numerals 1 to 9 and 0 as well as other symbols such as the hyphen (-) and equals (=). To simplify use of the keyboard, all the vowels are provided through the keyboard as independent characters. Although the numerals may be displaced from the number row, the Hindi numerals may be made available on the number keypad, as shown in FIG. 1. However, in the majority of cases Roman numbers are used in Hindi (and other Indian languages). The Roman numbers can be accessed using the $G_0$ English script.

In addition to vowels, Hindi also includes "vowel signs." A vowel sign is typically represented using a diacritical mark, called a "Matra", which is written above, below, before, or after the consonant to which the vowel belongs. There are a variety of different Matra to signify various vowel sounds.

The combination of Hindi consonant characters with the various diacritical vowel markings results in a multiplicity of possible Hindi characters. Mapping the vowel signs to independent keys may drastically reduce the number of keys needed to generate these combinations. As shown in FIG. 2, the Matras (vowel signs) are provided in the first row of the keyboard layout in the $G_1$ character set and are accessed by the SHIFT key+Vowel key. In addition, combination characters may be provided in the $G_1$ character set.

It will be apparent to one skilled in the art that the vowels do not necessarily need to be placed on the number row. For example, in an alternative embodiment as shown in FIG. 5, all the vowels could be grouped to the left side of the keyboard and the Varg consonants grouped elsewhere on the keyboard.

B. Hindi Consonants

In FIG. 1, Varg consonants in the $G_1$ character set are arranged in rows Q-W-E-R-T, A-S-D-F-G, Z-X-C-V-B, Y-U-I-O-P, H-J-K-L-; and N-M-,-.-/. These rows of 5 characters extend across the keyboard in a horizontal or left-right direction (i.e. on a standard keyboard) in FIG. 1. A row may also be defined in another direction (i.e. 4-R-F-V on a standard keyboard). Commonly used compound consonant characters are shown in the $G_1$ character set in FIG. 2 and may be accessed by pressing the modifier (e.g., SHIFT) key. Other Brahmi derived scripts (e.g., Tamil and Thai) have additional sounds not derived from Brahmi and these may also be accessed using the modifier (e.g., SHIFT) key.

Figure 6:
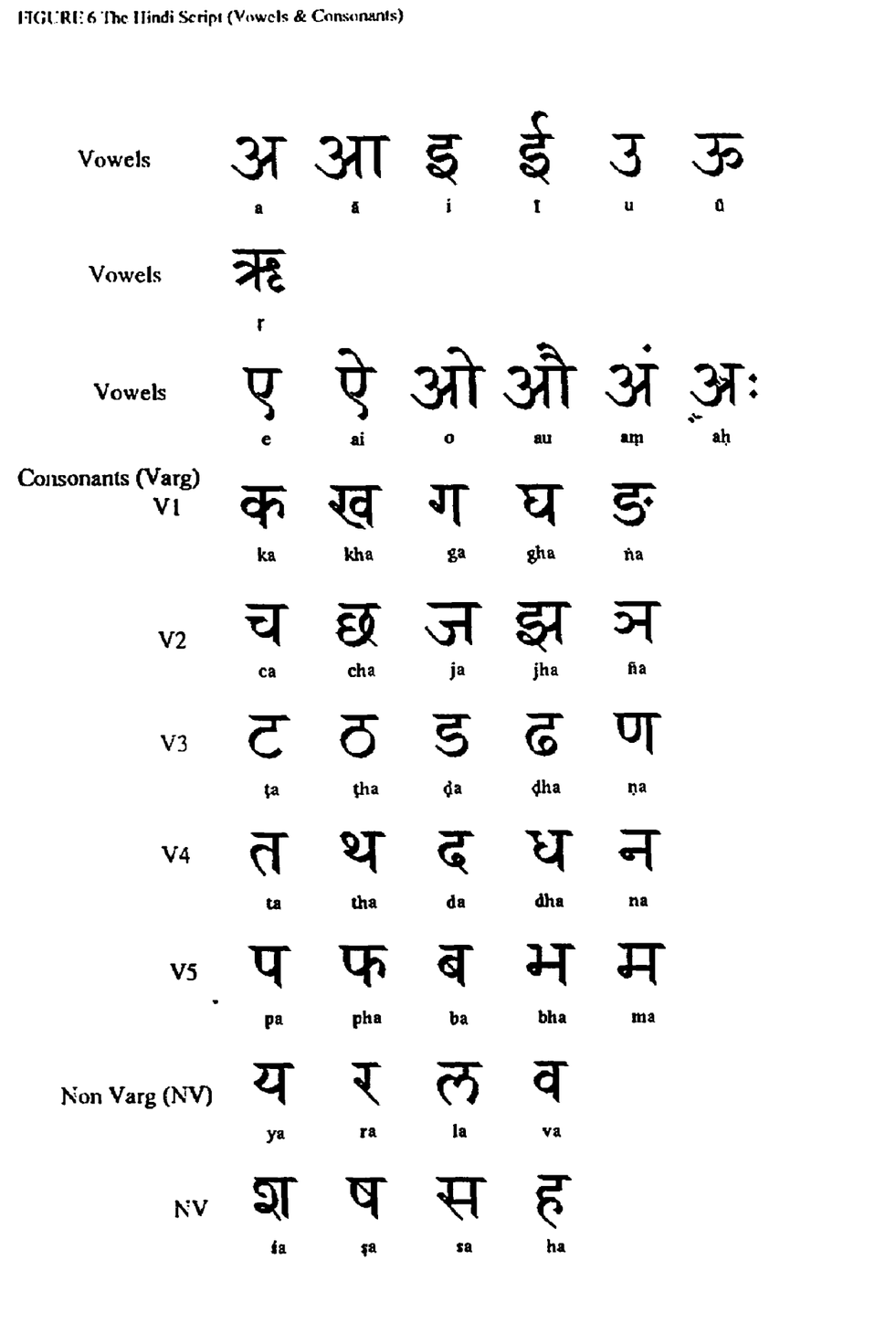
FIG. 6 shows Hindi vowels and consonants.

Hindi consonants may be characterized as "Varg" and "Non-Varg". Varg consonants are arranged in groups of five consonants, as indicated in FIG. 6. The Hindi script includes five Vargs sets (V1, V2, V3, V4, and V5) and a few non-Varg (uncategorized, NV) consonants. The consonants belonging to the five Vargs occupy most of rows R2, R3, and R4. In one embodiment, shown in FIG. 1 and the top embodiment of FIG. 5, the remaining Devanagari characters in rows R2, R3, and R4 are non-Varg consonants. Additional non-Varg consonants, and a few double characters are included in the $G_1$ character set accessed by the SHIFT key shown in FIG. 2.

Figure 3:
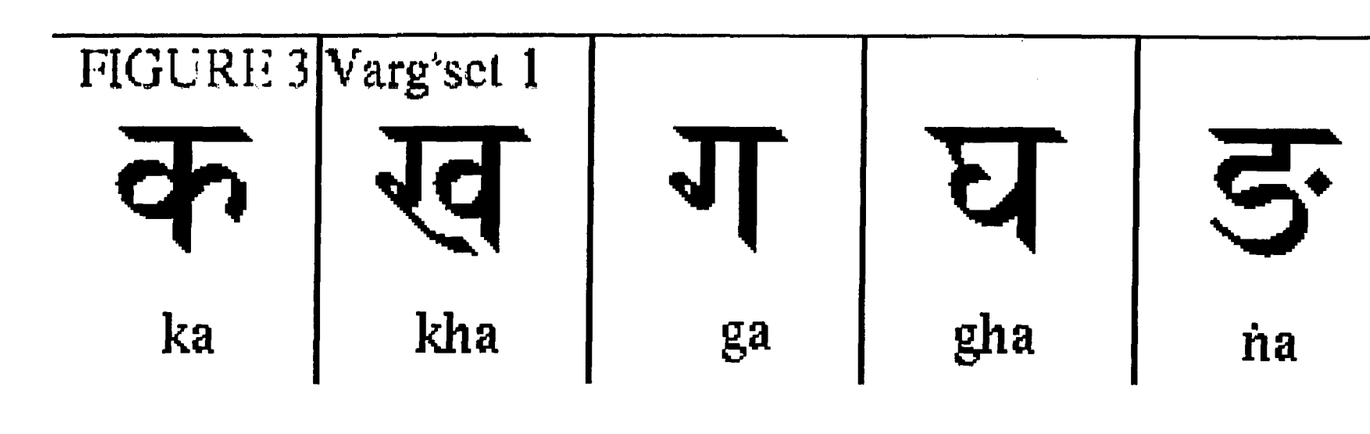
FIG. 3 is a plan view of keys including characters of the first Hindi Varg set.

Referring now to FIG. 3, a key layout I for Varg 1 is shown. The first two consonants of each Varg constitute the Primary Pair (PP). The second two consonants of each Varg constitute the Secondary Pair (SP). The second consonant of each pair is the aspirated counterpart (has an additional "h" sound) of the first consonant in the pair. The last consonant of the five consonants in a Varg includes a nasal pronunciation.

As shown in FIG. 1 and FIG. 3, the Varg consonants are mapped onto the keyboard layout in a sequential group including, from left to right, PP, SP and the fifth consonant. While in FIG. 1 the Vargs appear in horizontal rows, it will be apparent to one skilled in the art that the consonants of each Varg could be grouped in a different manner than shown in FIG. 1. For example, consonants in a Varg could be clustered on keys that are adjacent (e.g. F-G or G-T) or diagonal (e.g. F-V) from one another, or grouped onto diagonal rows (e.g. corresponding to keys 4-R-F-V on a standard keyboard.)

In one embodiment, half-forms of consonants may be accessed by pressing the key to which the full consonant is mapped in conjunction with the modifier (e.g., SHIFT) key.

Figure 8:
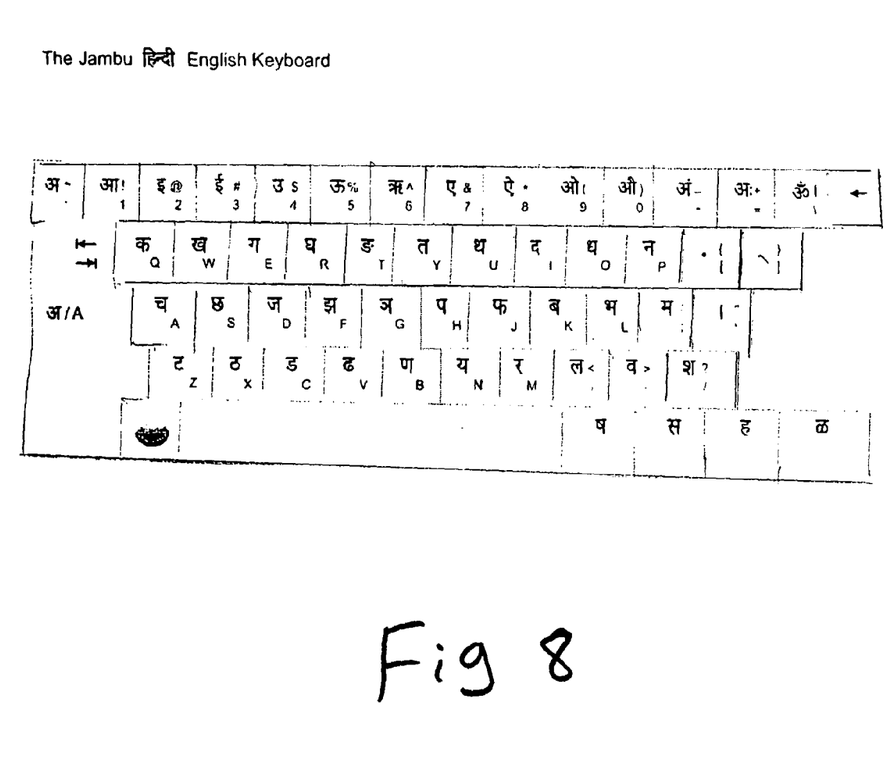
FIG. 8 is a plan view of a keyboard showing Hindi characters mapped to keys on the keyboard.

Other Details:

1. The Halant. A "Halant" character allows two or more consonants to be read as a single character. Some portions of Indian society find this "informal" scribing technique to be unacceptable because the practice departs from official written Hindi. Nonetheless, the Hindi-reading community generally understands and comprehends the technique of using Halants to join Hindi characters. A Halant key may be located on the >key as shown in FIG. 2 or the right bracket key ] as shown in FIG. 8.
2. The Viram. The Hindi full stop (period) may be accessed by SHIFT and / (FIG. 2) or the " (double-quotes) key in FIG. 8.
3. The Anuswar. The Anuswar, a nasal inflection, may be accessed by a Matra key: SHIFT and - as shown in FIG. 2 and FIG. 8.
4. The Chandrabindu. Another nasal inflection may be accessed by a Matra key: SHIFT and ~ as shown in FIG. 2 or the Matra key: SHIFT and | as shown in FIG. 8.
5. The Nukta. The Nukta is needed for writing some URDU and Punjabi sounds in Hindi and may be accessed by a Nukta key: \ as shown in FIG. 1; or, alternatively, by the left bracket key [ as shown in FIG. 8.
6. Compound characters commonly used Hindi: (See FIG. 2)
    'thr' (SHIFT and y)
    'gya' (SHIFT and d)
    'shr' (SHIFT and m)
    'ksh' (SHIFT and ')
    'om' (SHIFT and a, or the right-most character key in the number row (See FIG. 8)
    'lla'-pronounced hard (SHIFT and ,) or the Right CTRL key as shown in FIG. 8.
7. The half (r) sign is a commonly used one and is mapped to SHIFT and \.
8. The Hindi period (the Danda) may be located next to the left of the ENTER key as shown in FIG. 8 or the ? key next to the Right Shift key in FIG. 2 with a modifier key (e.g., SHIFT)

An additional software program may be used to run through the inputted material and replace all the halant derived compound characters (e.g., consonantal conjuncts) with traditional conjuncts from a library. This may be used in real time or at the end of the input sequence.

While the keyboard layout of FIGS. 1, 2 and 8 generally avoids the overuse of compound characters (e.g., consonantal conjuncts) to limit the number of characters on the keyboard and thereby promote rapid learning and ease of use, commonly used conjuncts may nonetheless be accessed using the modifier key (e.g., SHIFT) (FIG. 2). Additional space exists on the $G_1$ character set using the modifier key (e.g., SHIFT) to either add more compound characters if needed or additional characters (e.g., for Tamil and Thai).

The keyboard may also provide for access to characters in the English alphabet using the $G_0$ lower ASCII set. For example, the $G_0$ lower ASCII set may be accessed with the CAPS_LOCK key. The SHIFT key+the CAPS_LOCK key may access uppercase Roman alphabet. This feature may be important to users because many Hindi speakers prefer to write in a combination of Hindi and English. In addition, email and many web sites may only be accessed through English-alphabet addresses.

In one embodiment, pressing a particular key makes the English lower case ($G_0$) set available. Pressing another key, which may be a "sticky" key or the SHIFT key, makes English capitals accessible. In one particular embodiment, pressing the Caps Lock key makes the English lower case set available and pressing the remapped LEFT_CONTROL key (or any other unused key) makes the English upper case set available. In another particular embodiment, pressing an applet on the desktop makes the English lower case set available and pressing the CAPS_LOCK makes the English upper case set available.

In another embodiment, the key assignments may be spatially grouped on the keyboard according to phonetic characteristics of the characters and the way they are learned. In this embodiment, all the vowels and consonants of the Hindi script may be presented on a single keyboard. A halant (half-letter) symbol may also be presented. The vowels may be grouped together, and the vowel signs (Matras) may be evoked by SHIFT+Vowel key. The Varg consonants may be grouped in sets of 5, and Vowel diacritic signs (Matras), additional characters and commonly used compound characters (e.g., consonantal conjuncts) may be evoked by the modifier key (e.g., Shift) key.

The keyboard may be used with a personal computer such as an IBM®, Compaqe®, Dell®, or Apple® Macintosh® personal computer. A personal computer typically includes an operating system such as Windows 95®, Windows 98®, Windows ME®, Windows NT®, Windows 2000®, Windows XP®, Mac OS 7®, Max OS 8®, Mac OS 9®, Mac OS X® or Linux® software. The keyboard may also be used with other types of computer systems.

Figure 4:
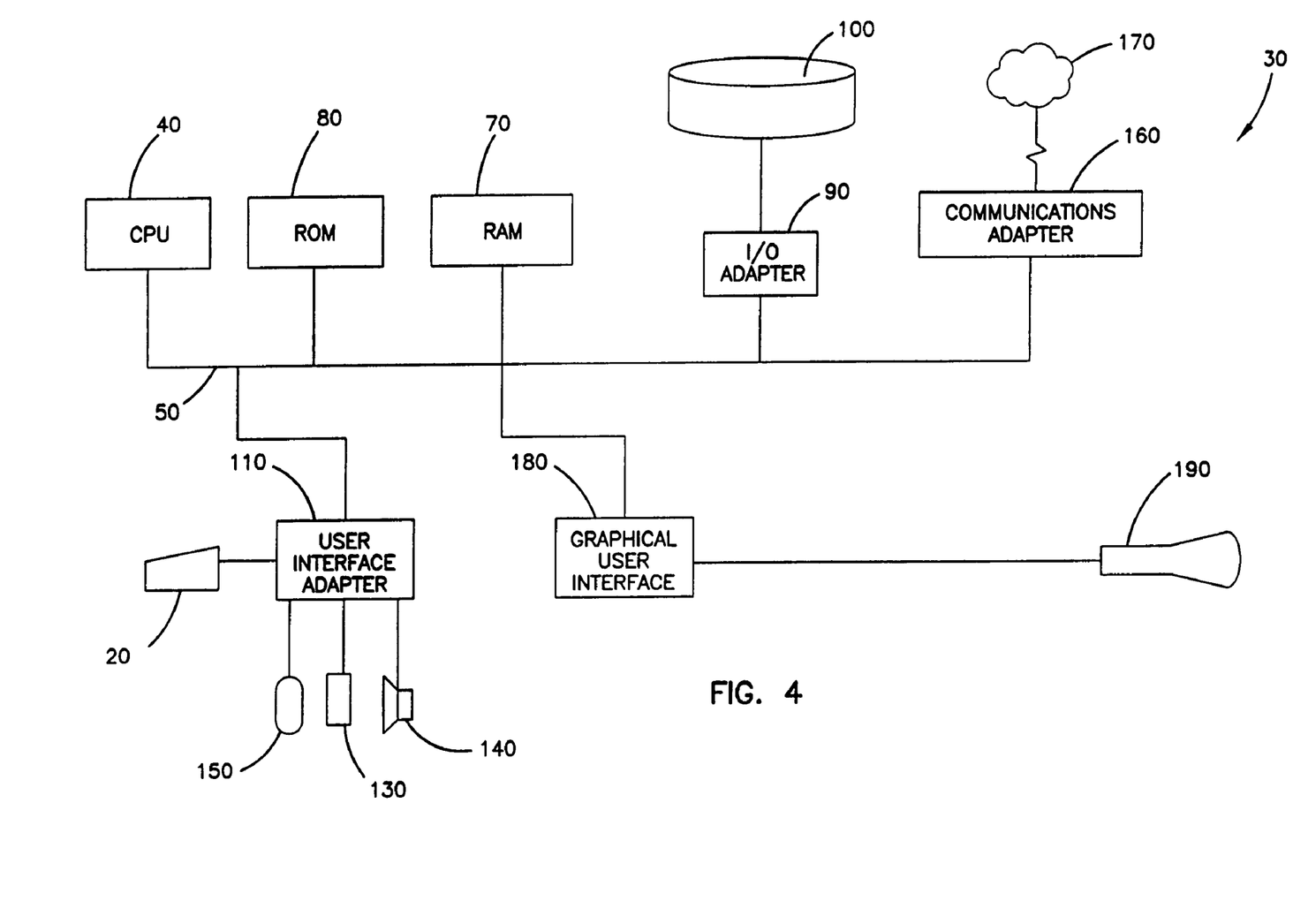
FIG. 4 is a block diagram of a computer system for use with the keyboard.

An example of a computer system 30 is shown in FIG. 4. The preferred hardware configuration may include a central processing unit 40, such as a microprocessor, and a number of other units that may be interconnected by a system bus 50. The computer system 30 may also be spread out over one or more interconnected computers or computer systems.

The system may also include a Random Access Memory (RAM) 70, Read Only Memory (ROM) 80, and an I/O adapter 90 for connecting peripheral devices such as disk storage units 100 to the bus 50. A user interface adapter 110 for connecting several input devices may also be included. Examples of possible input devices electronically coupled to the user interface adapter 120 include a keyboard 20, a mouse 130, a speaker 140, a microphone 150, and/or other user interface devices such as a touch screen. A communication adapter 160 may be included for connecting the system to a communication network link 170. A graphical user interface 180 may also be coupled to the system bus 50 and provides the connection to a display device 190. It will be apparent to those skilled in the art that the mouse 130 may be a typical mouse as known in the industry, or alternatively a similar device such as a trackball, light pen, or the like. The system may be configured to use a real keyboard or a virtual keyboard, such as an on-screen keyboard or that projects onto a surface.

The keyboard system and method may be used with most popular existing operating systems. A small program may be distributed either by floppy, CDROM or downloadable from the web to provide the functionality and instructions for mapping and using Hindi characters on a standard keyboard.

To implement the keyboard system and method with the XWINDOW desktop system (e.g., UNIX, LINUX, SOLARIS etc.), two XMM files (one for English and one for Hindi) may be invoked by desktop applets. Alternatively, a single 16-bit Unicode encoded XMM file with both English and Hindi may be used. An editor (e.g., gedit) may be accessed to type documents. Other application software may also be accessed—for example NETSCAPE in Hindi which provides a web browser, an email client and allows the composition of simple HTML web pages.

An additional software program may be used to run through the inputted material and replace all the halant derived compound characters (e.g., consonantal conjuncts) with traditional conjuncts from a library. This may be used in real time or at the end of the input sequence.

To implement the keyboard system and method with MICROSOFT WINDOWS operating system, a separate TrueType font (TTF) or OTF (Open Type Font) file of Hindi character set may be invoked because MICROSOFT WINDOWS, by design, does not generally allow low-level access to the keyboard. The MICROSOFT WINDOWS driver may be a stand alone program running on the MICROSOFT WINDOWS platform which includes fonts, a .DLL file, an executable, a splash screen etc. When activated and the Hindi font is chosen, the driver may provide both Hindi and English functionality on a standard keyboard. Any key that is not assigned a Hindi character may be used to switch between Hindi and English.

An additional software program, specific to MICROSOFT WINDOWS, may be used to run through the inputted material and replace all the halant derived compound characters (e.g., consonantal conjuncts) with traditional conjuncts from a library. This may be used in real time or at the end of the input sequence.

The keyboard method and system may employ Unicode or the ISCII standard to uniquely code the script characters. Unicode allows all the combinations in all Indian languages to have a unique hex code. These hex codes may be generated by a keyboard BIOS. Externally, the keyboard may have the same encoding vector.

While the embodiment shown in FIGS. 1 to 4 is configured for Hindi, the keyboard system and method can be easily adapted for related languages that use the Devanagari script or are derived from the Brahmi script of ancient India. For example, Devanagari script is also used to write Sanskrit, Nepali, Konkani, and Marathi. In addition, most of the other officially recognized Indian languages (Bengali, Telugu, Marathi, Tamil, Gujarati, Kannada, Malayalam, Oriya, Punjabi, Assamese, Manipuri) derive their scripts from the Brahmi script. This general approach may also be used for non-Indian languages using Brahmi derived scripts (Sinhala, Nepali, Burmese, Tibetan, Laotian, Thai, Khmer, Javanese, Bali, Batak, Bugis/Buginese and Tagalog).

While these languages differ significantly from Hindi in syntax and grammar and the scripts may differ significantly in shape and combinations, the number of vowels and consonants are in the same ball-park range as Hindi. As a result, the keyboard embodiment shown may be adapted for use with all these languages. The keyboard method and system may have similar encoding vectors for vowels and consonants for all the official Indian languages. Because each these languages may be assigned a unique Unicode hex code, it is also straightforward to make Unicode enabled keyboards for these other languages.

As shown by FIGS. 1, 2, 5 and 8, the key concepts are not the assignment of particular characters to particular keys, but rather the majority of the alphabets of a particular language displayed and grouped according to vowels, related consonants and the manner in which the characters are learned. In one embodiment, a standard keyboard (i.e. a conventional QWERTY-style keyboard, DVORAK keyboard, Spanish keyboard, etc.) in combination with software may be configured for use with the Hindi script and for other language scripts derived from Brahmi, based on assignment of Hindi characters (or other Brahmi-derived script characters) to keys of a standard keyboard.

FIG. 8 shows a preferred embodiment of a keyboard. As shown in FIG. 8, the Hindi vowels are assigned to the keys in the number row in the order in which the vowels are taught. The right-most character key in the vowel row is mapped to the "Om/Aum" sign. Pressing the Om/Aum key in conjunction with the SHIFT key produces the Chandrabindu—the diacritical mark associated with "Om/Aum." The Varg consonants are assigned to keys in the order in which they are learned. The Vargs are mapped according to the organizational arrangement depicted in the "preferred" schematic representation in FIG. 5. The non-Varg consonants are placed in the order they are taught/learned at the bottom right above the space bar. As shown in FIG. 8, the remaining non-Varg consonants are placed on the Right Alt key, the Right Windows key, the Right Mouse button key and the Right Control key.

The embodiment shown in FIG. 8 also includes a Nutka key mapped to the left square bracket key (i.e. the [ key, which is to the right of the letter P.) The Halant is shown placed to the right of the Nutka key (the right square bracket key, i.e., the ]

key). The Danda (the Hindi period) is shown placed next to the ENTER key two rows below the number (Hindi vowel) row.

In another embodiment, a set of replacement keys or stickers is provided. The replacement keys or stickers may be used to convert a keyboard for use with Hindi or other Brahmi-derived languages. The keys may be removed from a keyboard and the replacement keys (or stickers affixed to the top of the keys) installed to allow a user to identify the Hindi character (or other character) that is mapped to a particular key. The keys may be configured to be installed according to at least one of the organizational schemes as described and shown in the Figures.

A keyboard skin may also be provided. A skin may be configured to fit over an existing keyboard. The skin may be printed or otherwise marked with characters to indicate which characters are mapped to particular keys.

Glossary of Terminology:

Anuswar: A dot above a character representing a nasal sound.

Brahmi script: This elegant script appeared in India most certainly by the 5th century BC, but just like the Greek alphabet, it has many local variants, which suggests that its origin lies further back in time. It is in this script that the ancient Indian king Asoka inscribed his laws onto monumental columns. The Brahmi script was the ancestor of all Indian writing systems, including the Devanagari. In addition, many Asian scripts, such as Burmese, Thai, Tibetan and even Japanese to a very small extent (vowel order), were also derived from Indian script.

| The Brahmi script | | | | | |
|---|---|---|---|---|---|
| a | á | i | T | u | O |
| e | | ai | o | -ṃ | |
| ka | kha | ga | gha | | |
|ča | čha | ja | jha | ña | |
| ṭa | ṭha | ḍa | ḍha | ṇa | |
| ta | tha | da | dha | na | |
| pa | pha | ba | bha | ma | |
| ya | ra | la | ḷa | va | |
| sa, ṣa | ṣa | śa | sa | ha | |

Chandrabindu: Is a crescent and a dot above the character representing a nasal sound.

Devanagari script: A highly cursive descendent of the Brahmi script. Many languages, such as Hindi, Sanskrit, Marathi and Nepali use the Devanagari script or a subset of it.

| The Devanagari script | | | | | |
|---|---|---|---|---|---|
| अ | आ | इ | ई | उ | ऊ |
| a | ā | i | ī | u | o |
| ऋ | ॠ | ऌ | ॡ | | |
| r | ṛ | l | ḷ | | |
| ए | ऐ | ओ | औ | अं | अः |
| e | ai | o | au | aṃ | aḥ |
| क | ख | ग | घ | ङ | |
| ka | kha | ga | gha | ṅa | |
| च | छ | ज | झ | ञ | |
| ca | cha | ja | jha | ña | |
| ट | ठ | ड | ढ | ण | |
| ṭa | ṭha | ḍa | ḍha | ṇa | |
| त | थ | द | ध | न | |
| ta | tha | da | dha | na | |
| प | फ | ब | भ | म | |
| pa | pha | ba | bha | ma | |
| य | र | ल | व | | |
| ya | ra | la | va | | |
| श | ष | स | ह | | |
| śa | ṣa | sa | ha | | |

$G_0$ and $G_1$ character sets: The first 128 characters in the ASCII 8-bit encoding scheme are referred to as the lower ($G_0$) character set. These typically code the lower and upper case Roman English alphabet. The remaining character set space (upper character set, extended ASCII character set or $G_1$ set) are not used in English but are used to code special additional characters e.g., umlauts in German, accented French characters or the Cyrillic alphabet of the Russian language.

Halant: This is a sign (an oblique dash) below the leading character of a pair (usually consonants) which signifies a conjunct of the two characters. This is an accepted way of joining 2 consonants instead of using an additional unique character. This cuts down the number of keys by an order of magnitude.

Inscript keyboard layout: The official Indian language keyboard encoding vector which encodes the whole Devanagari script. This includes Hindi, Marathi and Sanskrit languages.

ISCII (INDIAN SCRIPT CODE FOR INFORMATION EXCHANGE) is an encoding method which allows unique codes for all Indian script characters. It is essentially a subset of the Unicode standard.

Keyboard Encoding Vector: The order in which the letters of a script are arranged on the keyboard Matra: This is a vowel diacritic sign.

Nukta: This is the dot below, i.e., ".."—it is used for deriving other characters in Devanagari, Punjabi and when Urdu is written using Devanagari.

Om: A commonly used Hindu religious symbol.

Script: A complete set of characters used for the written form of one or more languages, e.g., the Roman script for the English Language, i.e., a, b, c . . . x, y, z.

Vargs: These are the initial consonants phonetically grouped in 5's. There are 5 such Varg groups of consonants. Additional, final consonants are the Non-Varg consonants (8 in Hindi).

Viram also called Danda: This is a full stop sign in Hindi (|). Verse endings in Sanskrit use a double Viram (||).

Visarg: Comes after a vowel and represents the 'h' sound. In Tamil this represents the Aytham '∴' sound.

The above specification, examples and data provide a complete description of the manufacture and use of the composition of the invention. Since many embodiments of the invention can be made without departing from the spirit and scope of the invention, the invention resides in the claims hereinafter appended.

I claim:

1. A character input system using a keyboard comprising a plurality of keys, at least some of the keys each being assigned at least one Brahmi-derived script character, and at least one key being assigned a halant, the key assignments being spatially grouped on the keyboard according to vowels and consonants and arranged in accordance with the manner the vowels and consonants are taught, the system being configured such that diacritic vowel signs (Matras) may be accessed by pressing a modifier key with the corresponding vowel key; and half-forms of consonants may be accessed by pressing a modifier key with the corresponding consonant key.

2. The character input system of claim 1 wherein the consonants are grouped according Vargs and Non-Vargs arranged in the order in which the characters are taught.

3. The character input system of claim 1 wherein the modifier key is the SHIFT key.

4. The character input system of claim 3 wherein the keyboard comprises:
   a group of vowel keys each being assigned a script vowel, the vowel keys comprising keys corresponding to the number-row on a standard keyboard;
   a first Varg group of phonetically-related consonant keys comprising keys corresponding to Q-W-E-R-T on a standard keyboard;
   a second Varg group of phonetically-related consonant keys comprising keys corresponding to A-S-D-F-G on a standard keyboard;
   a third Varg group of phonetically-related consonant keys comprising keys corresponding to Z-X-C-V-B on a standard keyboard;
   a fourth Varg group of phonetically-related consonant keys comprising keys corresponding to Y-U-I-O-P on a standard keyboard; and
   a fifth Varg group of phonetically-related consonant keys comprising keys corresponding to H-J-K-L-; on a standard keyboard,
   a final group of Non-Varg consonant keys comprising an upper set of keys corresponding to N-M-,-.-/ and a lower set of keys below the upper set of keys and to the right of the space bar on a standard keyboard.

5. The character input system of claim 1 wherein the keyboard is adapted for use with one of the group of Hindi, Bengali, Telugu, Marathi, Tamil, Gujarati, Kannada, Malayalam, Oriya, Punjabi, Assamese, Manipuri and Sanskrit.

6. The character input system of claim 1 wherein the keyboard is adapted for use with one of the group of Sinhala, Nepali, Burmese, Tibetan, Laotian, Thai, Khmer, Javanese, Bali, Batak, Bugis/Buginese and Tagalog.

7. A method of adapting a keyboard for a language that uses a Brahmi-derived script such as the Hindi script, the keyboard being linked to a computer system, the method comprising:
   mapping vowels characters to vowel keys;
   mapping initial consonant characters to initial consonant keys;
   mapping final consonant characters to final consonant keys; and
   mapping a halant character to a halant key;
   if a vowel key, initial consonant key, or final consonant key is pressed, sending a signal to the computer system corresponds to the character that is mapped to the pressed key;
   if a modifier key is pressed in coordination with pressing an initial consonant key, a vowel key, or a final consonant key, sending a signal to the computer system that corresponds to Matra (for vowels) or a half-form of the character that is mapped to the key that was pressed in coordination with the modifier key.

8. The method of claim 7 wherein the vowel keys are arranged in a row on the keyboard.

9. The method of claim 7 wherein the initial consonant keys are grouped on the keyboard according to Vargs, the keys corresponding to consonants in each Varg being arranged on a single row.

10. The method of claim 7 wherein the final consonant characters are mapped to keys on two horizontally adjacent rows of keys.

11. A computer system for use with a language that uses Brahmi-derived script, the computer system comprising:
   a processor;
   a memory system;
   a graphical user interface; and
   a keyboard comprising a plurality of keys, at least some of the keys each being assigned at least one Brahmi-derived script character, the key assignments being spatially arranged on the keyboard according to the order in which the characters are taught;
   wherein the system makes half-forms of characters available by pressing a modifier key in coordination with a key that is assigned to a corresponding full character;
   wherein the system makes a Brabmi-derived script environment available by pressing a single key.

12. The system of claim 11 wherein the keyboard comprises a virtual keyboard.

13. The system of claim 11 wherein the virtual keyboard comprises a touch-sensitive screen.

14. A computer-readable medium embodying instructions to:
   map a Brahmi-derived script character to a key on a keyboard that operates with a computer system;
   if the key is pressed, send a signal to the computer system corresponds to the character that is mapped to the pressed key;
   if a modifier key is pressed in coordination with pressing the key, send a signal to the computer system that corresponds to a half-form of the character that is mapped to the key.

15. The computer-readable medium of claim 14 further embodying instructions to:
   map the Hindi vowels to respective vowel keys;
   map the Hindi initial consonants to respective initial consonant keys; and
   map the Hindi final consonants to respective final consonant keys; and map the Hindi numerals to the number pad.

16. The computer-readable medium of claim 14 further embodying instructions to map a halant to a key and, if the halant key is pressed, send a signal that corresponds to the halant.

17. The computer-readable medium of claim 14 further embodying instructions for receiving a signal on the computer system and, in response to the signal, presenting a Hindi character on a display device.

18. The computer-readable medium of claim 14 further embodying instructions to, if a second modifier key is pressed in conjunction with a character key, send a signal that corresponds to a character for the pressed key according to a second keyboard configuration.

19. The computer-readable medium of claim 18 wherein the second keyboard configuration comprises one a QWERTY configuration, a DVORAK configuration, or a Spanish language keyboard.

20. A kit for adapting a computer system for use with a Brabmi-derived language such as Hindi, the kit comprising:
- a computer-readable medium embodying instructions to:
  - map Brabmi-derived script characters to keys on a keyboard that operates with a computer system;
  - if a key is pressed, send a signal to the computer system corresponds to the character that is mapped to the pressed key;
  - if a modifier key is pressed in coordination with pressing a second key, send a signal to the computer system that corresponds to a half-form of the character that is mapped to the second key; and
- at least one of:
  - a computer keyboard skin configured to overlay a keyboard, the skin being marked to indicate the Brabmi-derived script characters that are mapped to particular keys on the keyboard;
  - a set of replacement keys or stickers for installation on a computer keyboard, the replacement keys or stickers being marked to indicate the Brabmi-derived script characters that are mapped to particular keys on the keyboard; or
  - a replacement keyboard comprising keys that are marked to indicate the Brahmi-derived script characters that are mapped to particular keys on the keyboard.

* * * * *